United States Patent [19]

Jan et al.

[11] Patent Number: 5,031,428
[45] Date of Patent: Jul. 16, 1991

[54] TWO STAGE AUTOMOBILE STEERING LOCK

[76] Inventors: Shwu M. Jan, No. 7-2, Alley 13, Lane 54, Sec. 2, Hsing-Nan Road, Jung-Heh, Taipei Hsien; Hsien P. Chen, No. 76, Lane 274, Jung-Jeng S. Road, Yung-Kang Shiang, Tainan Hsien, both of Taiwan

[21] Appl. No.: 597,056

[22] Filed: Oct. 15, 1990

[51] Int. Cl.⁵ ............................................. B60R 25/02
[52] U.S. Cl. .......................................... 70/209; 70/226
[58] Field of Search ................. 70/209, 211, 212, 225, 70/226, 237, 238, 380

[56] References Cited

U.S. PATENT DOCUMENTS

| | | | |
|---|---|---|---|
| 4,730,470 | 3/1988 | Zane et al. | 70/238 |
| 4,738,127 | 4/1988 | Johnson | 70/209 |
| 4,747,279 | 5/1988 | Solow | 70/211 X |
| 4,887,443 | 12/1989 | Wang | 70/226 X |
| 4,935,047 | 6/1990 | Wu | 70/238 X |

FOREIGN PATENT DOCUMENTS

| | | | |
|---|---|---|---|
| 1127524 | 9/1968 | United Kingdom | 70/226 |
| 2024307 | 1/1980 | United Kingdom | 70/238 |

Primary Examiner—Lloyd A. Gall
Attorney, Agent, or Firm—Bacon & Thomas

[57] ABSTRACT

An antitheft device for attachment to a steering wheel of an automobile comprising an elongated body member having a passageway extending along an axis therein, a first hook secured to the body member for engagement with a portion of the steering wheel wherein the first hook engages the wheel from the inside thereof with the body member extending outward beyond the periphery of the steering wheel, an elongated tubular member adapted to move in telescopic fashion in the passageway of the body member along the axis, a second hook secured to the tubular member for engaging the inside portion of the steering wheel diametrically opposed to the first hook, a rod member adapted to move in telescopic fashion within the tubular member for preventing the steering wheel from complete rotation and a locating member associated with the body member engaging the tubular member and rod member within the passageway that allows the tubular member and the rod member to extend with respect to the body member and be locked at any of a plurality of selectable positions.

1 Claim, 5 Drawing Sheets

TWO STAGE AUTOMOBILE STEERING LOCK

FIELD OF THE INVENTION

The present invention relates to an automobile antitheft device, and more particularly to a device for attachment to an automobile steering wheel to prevent complete rotation of the wheel and securing the automobile against unauthorized driving.

BACKGROUND OF THE INVENTION

Antitheft devices which attach to an automobile steering wheel have been known heretofore, as shown in U.S. Pat. No. 4,738,127 to Johnson. Such antitheft device for attachment to a steering wheel of an automobile includes an elongated body member having a passage way extending along an axis therethrough, an elongated rod member adapted to move in telescopic fashion in the passage way of the body member along the axis, opposed hooks for engaging inside portions of the steering wheel and lock means associated with the body member engaging the rod within the passage way for locking the rod within the passage and stationary with respect to the body member at any of selectable a plurality of positions. While the antitheft device described above is functional, it includes several disadvantages. For example, both in and out telescopic movements of the rod member require a key to unlock the lock means. Another problem with such device is that it presents pry points wherein a rigid pin or arcuate ruler-like thin objects can be inserted through a gap between the passage and periphery of the rod member to reach a spherical bearing of the lock means and press it down by overcoming the bias force of a spring member thereon to release it from engagement in a groove in the rod member and unlock the device. Yet another problem with the device is that, in order to prevent complete rotation of a steering wheel of a car, the elongated body member must be relatively long and thus cannot be carried in the cabinet of the car.

It is accordingly a primary object of this invention to provide an automobile steering lock that overcomes the foregoing disavantages associated with prior art devices.

Another object of this invention is to provide an automobile steering lock which can extend in two stages so as to reduce its overall length in a collapsed state.

Yet another object of this invention is to provide an automobile steering lock that extends to dispose same in a locking condition.

A further object of this invention is to provide a locking device wherein the locking mechanism is totally enclosed therein and includes no area susceptible to prying by a crowbar, rigid pin or the like.

DETAILED DESCRIPTION OF THE PREFERRED EMBODIMENT

Figure 1:
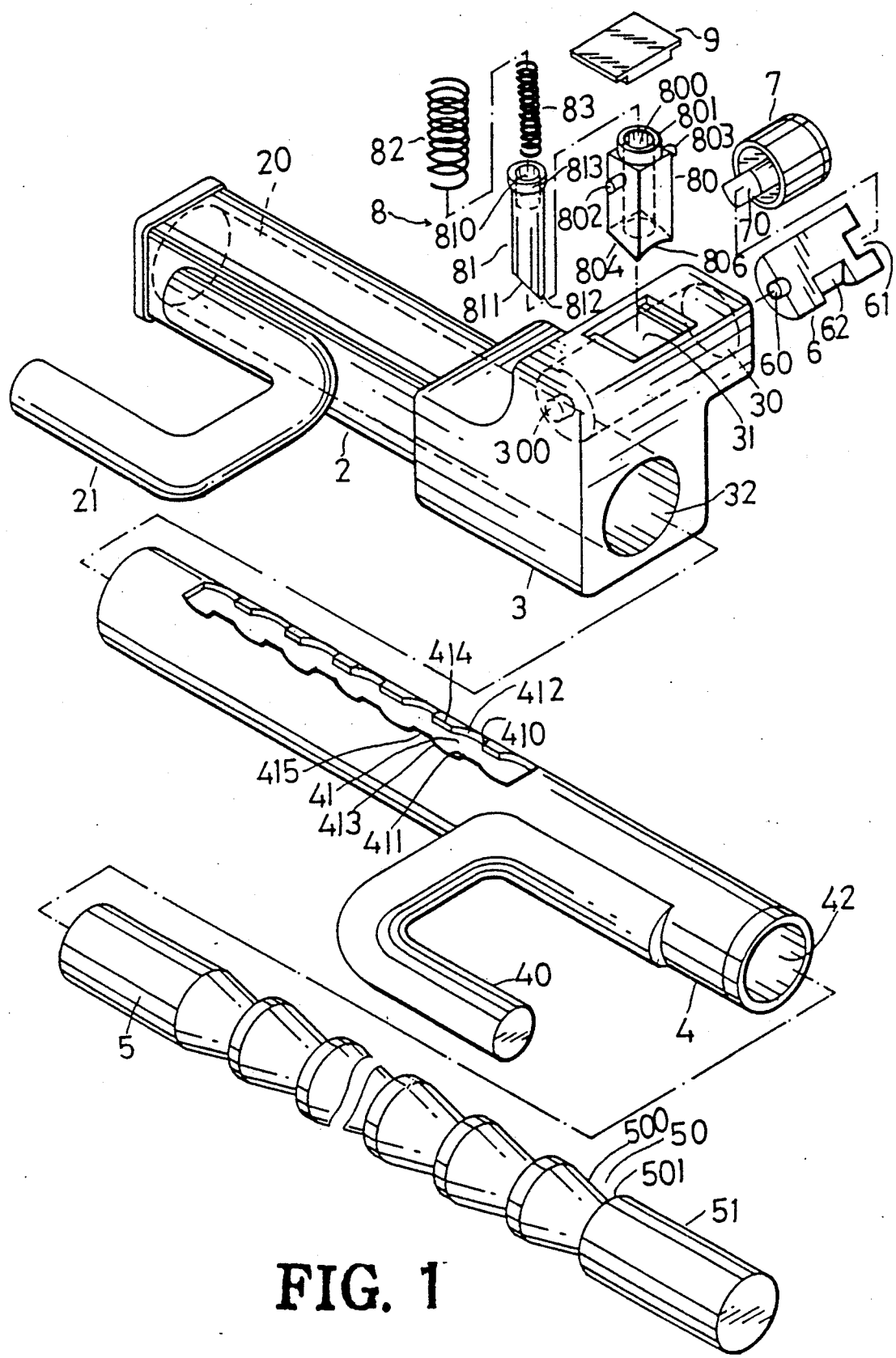
FIG. 1 is an exploded perspective view illustrating a preferred embodiment of the present invention.
Figure 2:
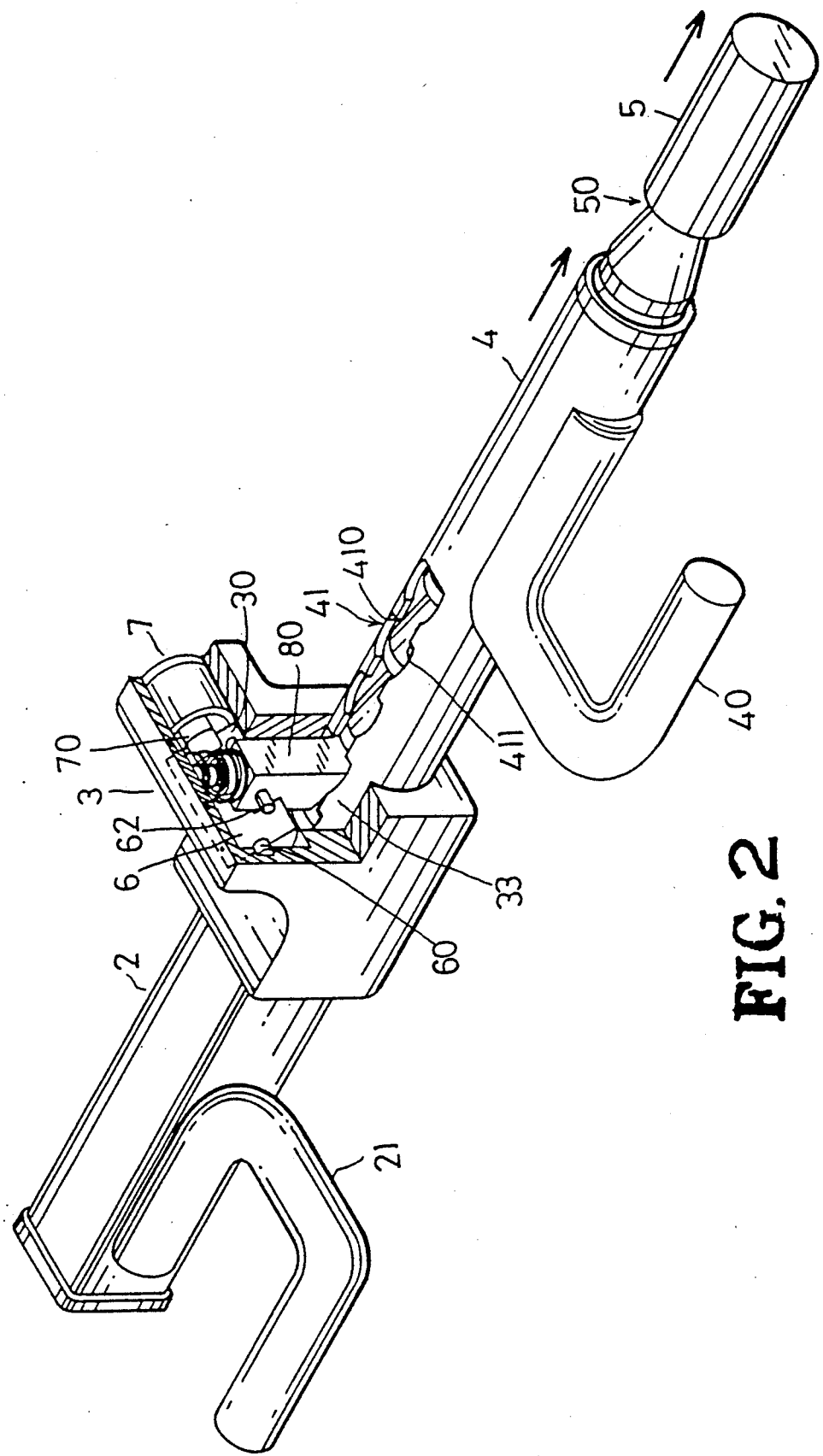
FIG. 2 is a perspective yet partially broken view of the embodiment of the present invention in an assembled state.

Referring to FIGS. 1 and 2, an automobile steering lock according to the invention comprises an elongated body member 2, an elongated tubular member 4 which is dimensioned to move in telescopic fashion within body member 2, an elongated rod member 5 which is dimensioned to move in telescopic fashion within the tubular member 4, hooks 21, 40 for engaging opposed portions of a steering wheel from the inside thereof, being respectively provided on the body member 2 and tubular member 4, a housing 3 and a locking mechanism including a locking means 7, an actuating means 6 and a locating means 8, being provided within the housing 3 to position and lock the tubular member 4 and rod member 5 stationary with respect to the body member 2 at any of selectable a plurality of positions.

Said body member 2 is in the form of an elongated tube defining a central passage 20 extending longitudinally therethrough. The first generally L-shaped member 21 is fixedly secured to the tube 2 by means of welding to form a hook which opens rearwardly along the body member 2. Said tubular member 4 is in the form of an elongated tube of circular cross-section of which the outer diameter is dimensioned slightly less than the diameter of the central passage 20 in the body member 2 to enable tubular member 4 to telescope freely within the body member 2. Tubular member 4 also defines a second cylindrical central passage 42 extending axially therethrough.

Second generally L-shaped member 40 is fixedly secured to the front end portion of the tubular member 4 to form a hook which opens opposite to the hook 21 for engagement with a diameterically opposed portion of a steering wheel. A corrugated slot 41 is longitudinally formed along a major top portion of the tubular member 4. The corrugated slot 41 includes a channel defined by plural pairs of opposed notches 412, 413 and opposed crest portions 414, 415. The front surfaces 410, 411 of the notches 412, 413 are preferably flat.

Said rod member 5 is in the form of an elongated rod of circular cross section and having a diameter that is dimensioned slightly less than the diameter of the second passage 42 in the tube 4 to enable the rod member 5 to telescope freely within the tube 4. A handle 51 is attached to an outer end of the rod 5. A plurality of annular grooves 50 are axially aligned along a major portion of the rod member 5. Each of the grooves 50 consists of a vertical side wall 501 positioned closer to the handle end 51 and substantially perpendicular to its longitudinal direction, and conical or sloping side wall 500 positioned further from the handle end 51.

Said housing 3 is connected to a front end of the body member 2 and includes a central passage 32 which extends therethrough and communicates with the central passage 20 of the body member 2. Housing 3 contains a locking mechanism including a locking means 7, an actuating means 6 and a locating means 8.

The housing 3 includes a boss integrally offset with respect to the axis of the body member 2 and having a first bore 30 extending transversely into the housing 3 for firmly receiving the locking means 7 which has a conventional key lock 7 and a projection 70 attached to an inner end of the key lock 7, and being terminated with a coaxial cylindrical recess 300.

To accommodate the locating means 8, a second bore 33, as shown in FIGS. 2 to 5, is vertically bored in the housing 3. Said bore 33 interconnects the bore 30 and the passage 32 in the housing 3. A hole 31 vertically in alignment with the second bore 33 is formed in a top wall of the housing 3 to facilitate inserting the locating means 8. A metal plate 9 is provided to close off the hole 31 by means of a press fit after assembly.

The locating means 8 includes a first rod-like bearing 80 having a circular projection 801 on top thereof for retaining the lower end of a first spring 82, a central passage 800 extending through the first bearing 80 and a pair of opposed pivots 802, 803, and a second rod-like bearing 81 of which the outer diameter is dimensioned slightly less than the diameter of the central passage 800 in the first bearing 80 to enable the second bearing 81 to slide freely within the first bearing 80 and the top portion is formed with a flange member 813 adapted to be supported on top of the first bearing 80 and a recess 810 for receiving the lower end of a second spring 83. The lower ends of the first and second rod-like bearings 80, 81 are provided with tenons defined by flat fronts 806, 812 and slanting bottoms 804, 811. The first and second spring 82, 83 of which the other ends abut against an inner surface of the metal plate 9 normally and respectively bias the first and second bearings 80, 81 towards the passage 32 in the housing 3.

The actuating member 6 is a segment of semicircular cross section and includes an arcuate outer surface, a flat top, a front wall formed with a recess or notch 61 for receiving the projection 70 of the key lock 7, a rear wall formed with a cylindrical projection 60 for rotatably fitting in the recess 300 and a lateral notch or cut-off portion 62 formed in one side of a middle portion thereof.

In assembly, as shown in FIGS. 2 to 5, the first rod-like bearing 80, which carries the second rod-like bearing 81 in the central passage 800 thereof, is inserted into the vertical passage 33 through the hole 31. The cylindrical key lock 7 is firmly received in the bore 30 with the projection 70 thereof fitted in the recess 61 of the actuating member 6 and the cylindrical projection 60 of the actuating member 6 is rotatably received in the recess 300 such that the actuating member 6 is disposed within the bore 30 with the notch or cut-off portion 62 positioioned vertically in alignment with the vertical passage 33 and opening 31. The flat top supporting the pivots 802, 803 of the first bearing 80 extends downwardly through the notch or cut-off portion 62, and is operable to slide or swing along the circumferential inner surface of the bore 30 by means of the projection 70 of the key lock 7. The spring 82, 83 are respectively mounted on the tops of the first and second bearings 80, 81 and are in a compressed state when the metal plate 9 is restored in the opening 31.

In operation, the first and second rod-like bearings 80, 81 are biased by the compressed springs 82, 83 toward the tube 4 in which the rod member 5 is received whereas the sharpened end 806 of the first bearing 80 protrudes into an opening of the corrugated slot 41 which is defined by a pair of opposed notches 412, 413 and meet the flat surfaces 410, 411 of the notches 412, 413, and the sharpened end 812 of the second rod-like bearing 81 protrudes from an open bottom of the first rod-like bearing 80 and into an annular groove 50 of the rod member 5 and meet the vertical side wall 501 of the groove 50. This prevents the tube 4 and rod member 5 from any collapsing movement and serves to lock the device while the actuating member 6 is positioned in a side segment position in the bore 30, as shown in FIGS. 2, 3 and 4.

Figure 3:
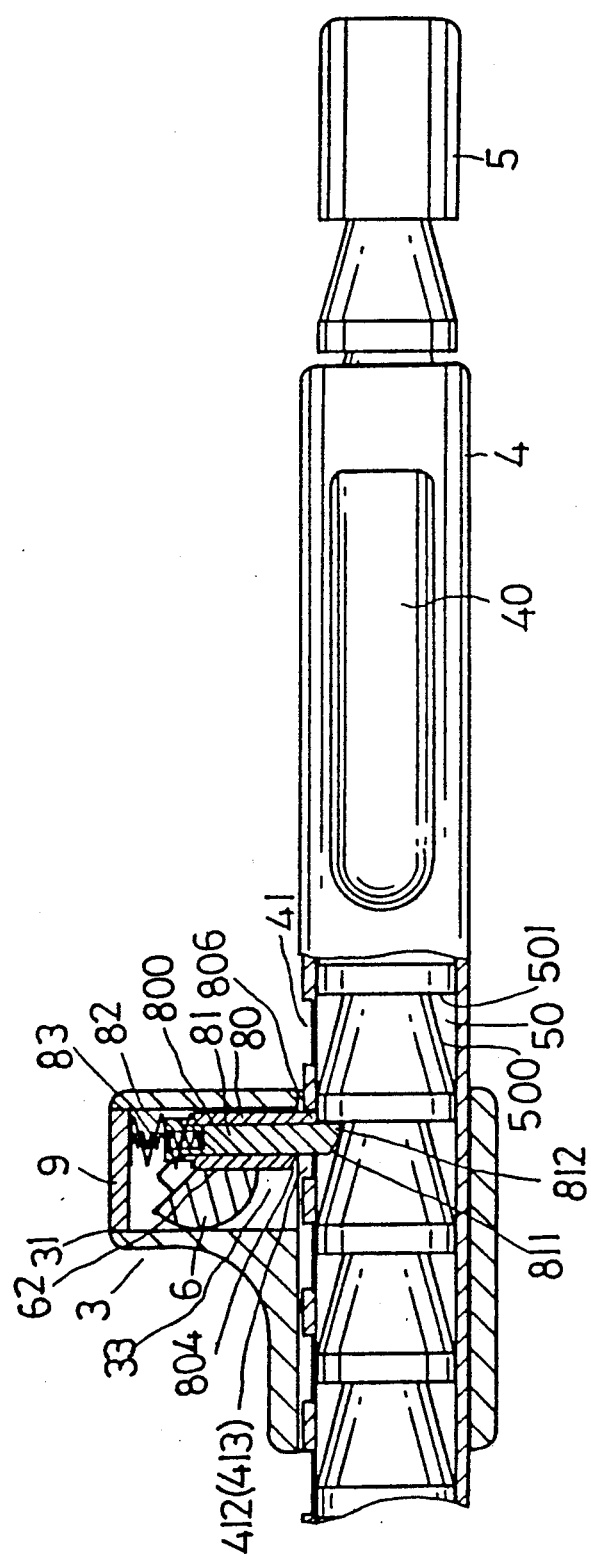
FIG. 3 is an enlarged and partially sectional view of the preferred embodiment.
Figure 4:
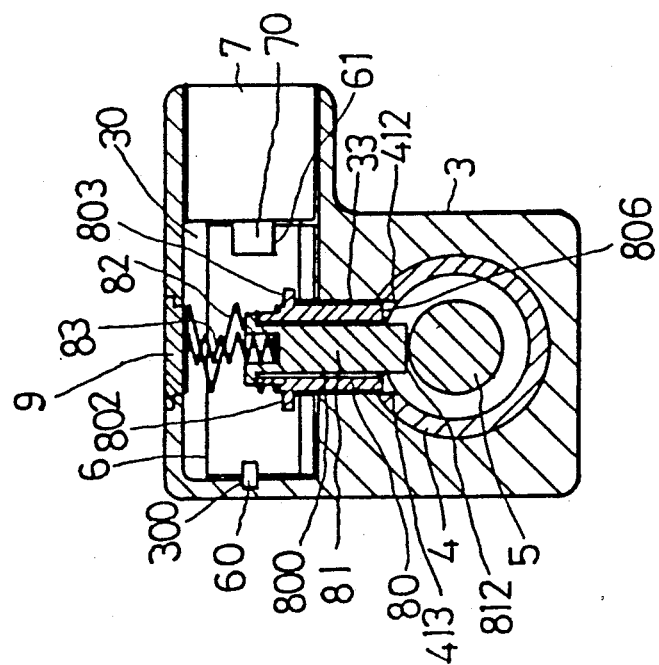
FIG. 4 is an enlarged cross-sectional view of a housing of the preferred embodiment in a locking state.
Figure 6:
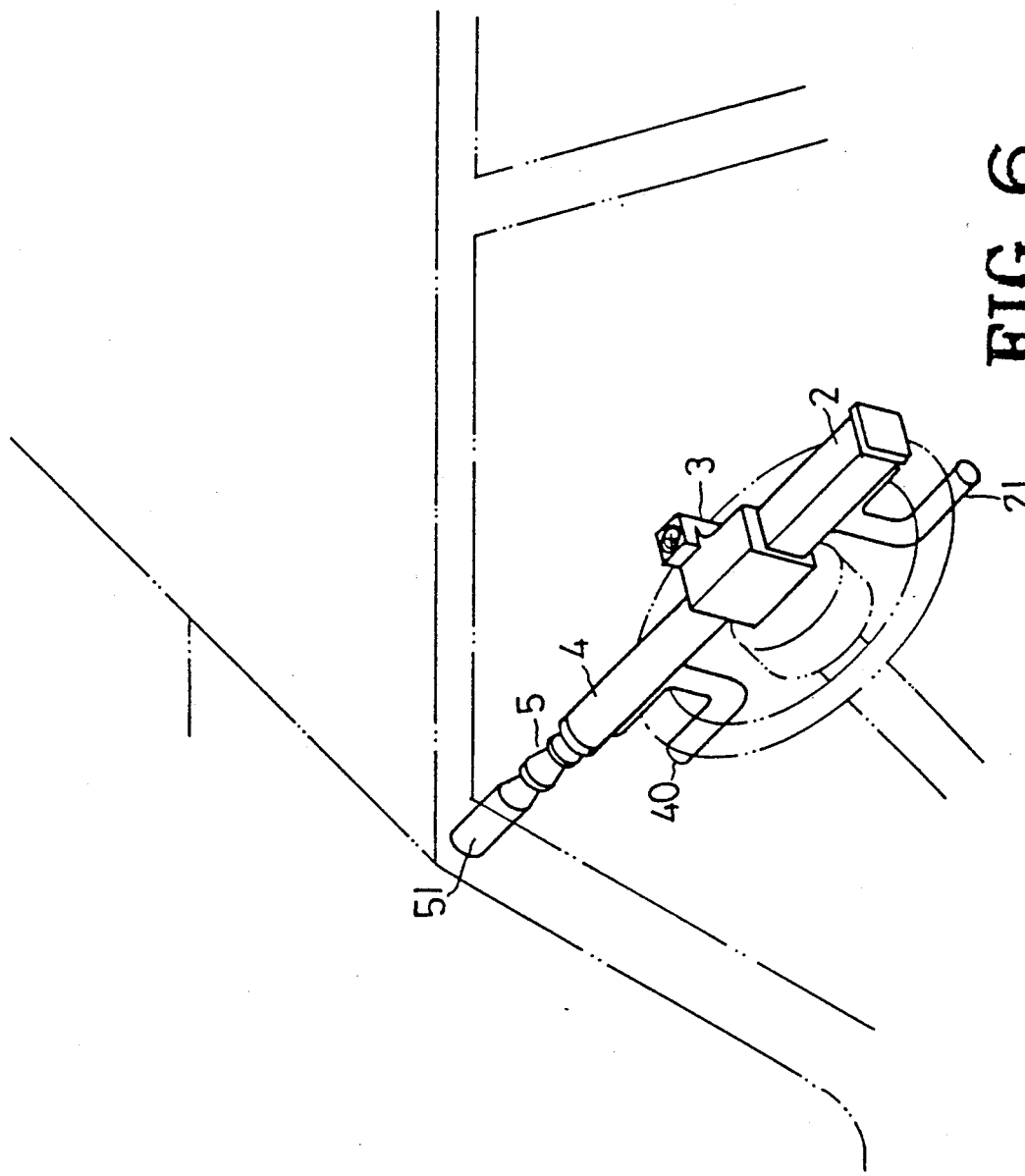
FIG. 6 is a perspective view showing the steering lock in a locked position on a steering wheel of a car.

Although in a locking condition, as shown in FIG. 3, engagement between the convex or slope side wall 500 of the annular groove 50 of the rod member 5 and the slanting bottom 811 of the second rod-like member 81 allows the rod 5 to extend in telescopic fashion with respect to the body member 2 by overcoming the biasing force of the spring 83 and engagement between the corrugated slot 41 of the tube 4 and the slanting bottom 804 of the first rod-like bearing 80. This allows the rod member 5 to extend in telescopic fashion with respect to the tube 4 by overcoming the biasing force of the spring 82. As a first state extension of the antitheft device according to the present invention which is in a locking state, the tube 4 can be extended for engaging opposed portions of a steering wheel with hooks 21, 40 and without a key to lock the device. Under such locking condition, the rod member 5 can further be extended by pulling the handle 51 thereof that serves namely as a second stage extension of the antitheft device to prevent complete rotation of a steering wheel of a car, as best shown in FIG. 6.

Figure 5:
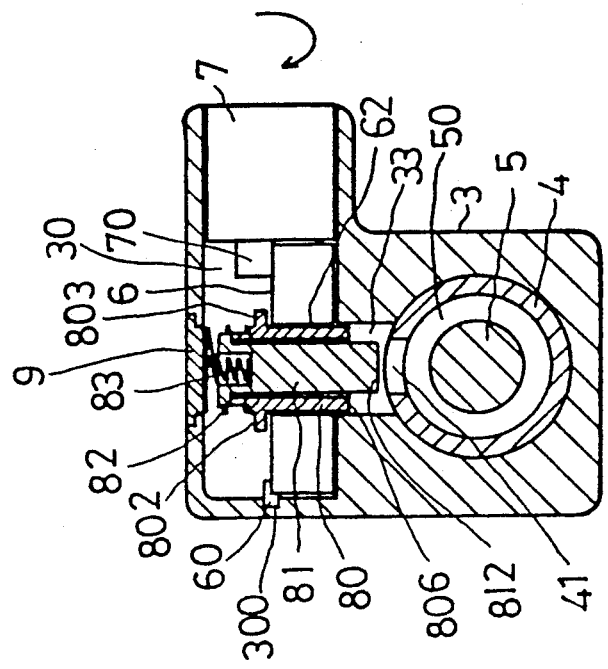
FIG. 5 is an enlarged cross-sectional view of a housing of the preferred embodiment in an unlocking state.

When the actuating member 6 is oriented about 45 degrees to a bottom segment position in the bore 30 by the key lock with a key, the flat top of the actuating member 6 is disposed in a substantially horizontal position. This permits the notched side of the actuating member 6 to be raised to lift the first rod-like bearing 80 in association with the second rod-like bearing 81 by overcoming biasing forces of the first and second springs 82, 83, as shown in FIG. 5, so as to withdraw the sharpened ends 806, 812 of the bearings 80, 81 from the slot 41 and the annular groove 50 of the rod member 5 into the vertical passage 33. This then permits the rod member 5 and the tube 4 to telescope in and out with respect to the body member 2.

While the invention has been described with respect to a preferred embodiment thereof, it is obvious that various modifications can be made therein without departing from the spirit of the present invention which should be limited only by the scope of the claims.

What is claimed is:

1. An anti-theft device for attachment to a steering wheel of an automobile comprising:

(a) a first elongate tubular member having an inner end, an outer end and a first longitudinal passageway extending therethrough, a first U-shaped hook extending from the first tubular member and including a closed end spaced from the inner end and an open end facing but spaced from the outer end, the first hook for engaging a steering wheel from a first inside portion thereof and disposing the outer end at a distance beyond the periphery of the wheel;

(b) a second elongate tubular member having an inner end, an outer end and a second longitudinal passageway extending therethrough; the inner end of the second tubular member being receivable within the first passageway to permit the second tubular member to extend relative to the first tubular member in a telescopic manner, and a second U-shaped hook secured to the outer end of the second tubular member, the second hook having an open end facing in a direction opposite to the open end of the first hook for engaging a second inside portion of the wheel opposite to the first inside portion thereof;

(c) a corrugated slot formed in the second tubular member and extending longitudinally thereof, the slot being defined by plural alternating pairs of opposed notches and opposed crest portions, each pair of the opposed notches having a pair of flat surfaces the inner end of the second tubular member;

(d) a rod member having an inner end receivable within the second passageway to permit the rod member to extend in a telescopic manner relative to the second tubular member, an outer end defining a handle, and a plurality of annular grooves longitudinally spaced along the rod member, each annular groove being defined by a vertical sidewall positioned closer to the handle and a conical sidewall positioned further from the handle;

(e) a housing means formed around the inner end of the first tubular member, the first passageway extending through the housing means, a first bore means formed in the housing means and including an arcuate inner surface and an axis with respect to the longitudinal axis of the first tubular member, and a second bore means formed in the housing means, the second bore means interconnecting the first bore means and the first passageway to provide communication therebetween;

(f) a lock disposed within the first bore means;

(g) bearing means including a first rod-like bearing slidably disposed in the second bore means and including a pair of opposed pivots, a central passageway therethrough and a first tenon member at a bottom thereof, and a second rod-like bearing received within the central passageway of the first bearing and including a second tenon member at a bottom end thereof, the second tenon member extending outwardly from the bottom end of the first bearing, the bearing means being disposable between a locking position wherein the first tenon member extends into engagement within the corrugated slat between a selected pair of opposed notches in the second tubular member and the second tenon member extends into engagement within a selected annular groove in the rod member, and an unlocking position wherein the first and second tenon members are withdrawn from the second tubular member and rod member;

(h) an actuating member having a semi-cicular cross-section defined by an arcuate outer surface corresponding to the arcuate inner surface of the first bore means and a flat top with one side thereof having a notch formed therein, the notch being disposable in alignment with the second bore means for retaining the first bearing and supporting the pair of pivots on the flat top;

(i) means for interengaging the actuating member and the lock for positioning the bearing means between the locking and unlocking positions; and (j) spring means mounted on the bearing means for biasing the first and second bearings towards the second tubular member and rod member.

* * * * *